United States Patent [19]

Grote

[11] Patent Number: 4,720,131
[45] Date of Patent: Jan. 19, 1988

[54] ASHTRAY, ESPECIALLY FOR MOTOR VEHICLES

[75] Inventor: Franz-Josef Grote, Schmallenberg, Fed. Rep. of Germany

[73] Assignee: General Motors Corporation, Detroit, Mich.

[21] Appl. No.: 942,682

[22] Filed: Dec. 17, 1986

[30] Foreign Application Priority Data

Jan. 25, 1986 [DE] Fed. Rep. of Germany ....... 3602197

[51] Int. Cl.$^4$ .............................................. B60N 3/08
[52] U.S. Cl. ................................. 296/37.9; 224/281
[58] Field of Search ........................... 296/37.9, 37.8; 224/280, 281; 206/567; 220/334, 335

[56] References Cited

U.S. PATENT DOCUMENTS

| 1,802,710 | 4/1931 | Edgar et al. | 224/281 |
| 2,161,770 | 6/1939 | Vissar | 224/281 |
| 2,162,142 | 6/1939 | Vissar | 224/280 |
| 2,660,180 | 11/1953 | Endicott | 206/567 |
| 3,166,080 | 1/1965 | Neale | 220/335 |

FOREIGN PATENT DOCUMENTS

| 1530755 | 8/1971 | Fed. Rep. of Germany . |
| 2263342 | 6/1974 | Fed. Rep. of Germany . |
| 7428998 | 8/1974 | Fed. Rep. of Germany . |
| 3316756 | 11/1983 | Fed. Rep. of Germany . |
| 1512415 | 2/1968 | France . |
| 92383 | 10/1968 | France . |

Primary Examiner—Robert R. Song
Attorney, Agent, or Firm—William A. Schuetz

[57] ABSTRACT

In an ashtray, a pivotally mounted closure member of an ashtray housing engages through pins arranged in the lateral portions of said closure member into vertically extending guide tracks arranged in the sidewalls of an ash receptacle. The pivot axis of the closure member and the pins engaging into the guide tracks are arranged such that when the closure member is moved into the open position, the ash receptacle is automatically moved forwardly, and is automatically returned into its storage position when the closure member is being closed.

4 Claims, 8 Drawing Figures

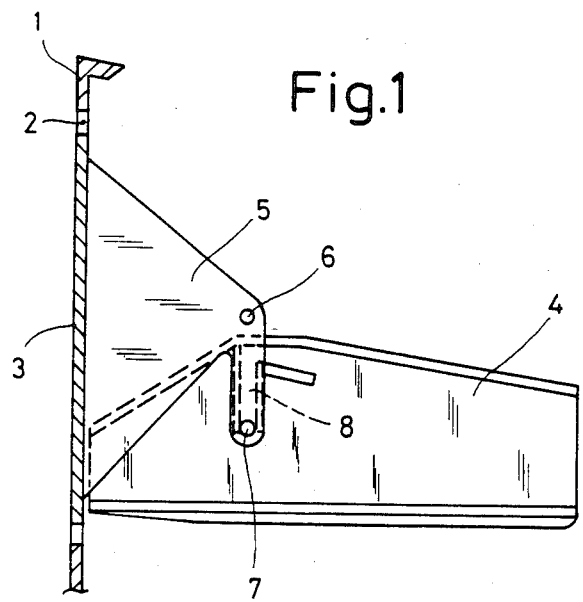
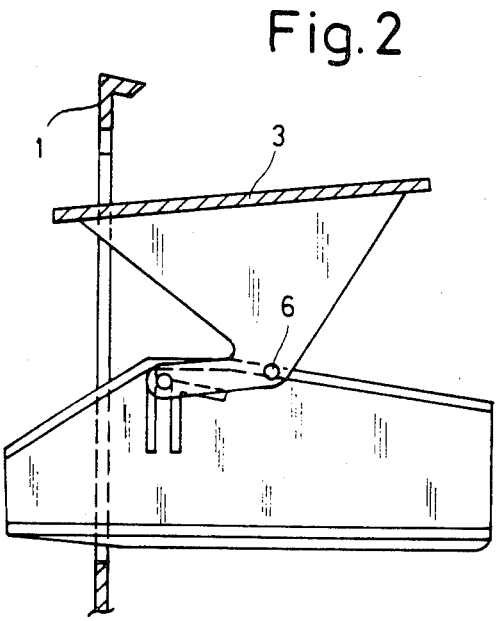

ASHTRAY, ESPECIALLY FOR MOTOR VEHICLES

The invention relates to an ashtray, especially an ashtray for motor vehicles, including an ash receptacle adapted for slidable displacement from a storage position into a position inside the occupant compartment, and a closure member which, when the ash receptacle is in the storage position, completely covers and conceals the receptacle, said closure member being interconnected with the ash receptacle to enable automatic sliding displacement of the ash receptacle, and the ash receptacle being biased by a spring into its forwardly projecting position. An ashtray of this type has been described in the German Offenlengungsschrift DE-OS 33 16 756.

In the case of ashtrays for use in motor vehicles, it is desirable that during non-use the ashtray can be returned, by way of sliding or pivoting movement, into a storage position, so that it does not project into the occupant compartment. In accordance with the above-mentioned German Offenlengungsschrift DE-OS 33 16 756, this is accomplished, as illustrated in FIGS. 7, 8 and 9 of that German publication, in that the side portions of the ash receptacle are provided with slots which extend in the direction of ash receptacle movement and which engage with pins provided in the ashtray housing. A lever, which is adapted for pivoting movement about a shaft fixedly arranged on the housing, and which is biased by the force of a compression-type spring, engages from above into a slotted link which extends perpendicularly to the movement of the ash receptacle and which is arranged on the upper side thereof and thereby exerts a biasing force on the ash receptacle when the same is in the projected position. The closure member is rigidly connected to the ash receptacle in the lower region thereof. When the ash receptacle is returned into its storage position, it is not only moved backwardly, but also slightly pivoted upwardly.

This prior art ashtray is adapted for mounting on the lower side of the dashboard, but is not suitable for mounting into a console arranged midway of the vehicle, because in a console the ash receptacle must not be allowed to move downwardly when it is moved into the in-use position. To enable the mounting of ashtrays into consoles, the same German Offenlengungsschrift proposes an arrangement in which an ash receptacle is mounted in the opening of an ashtray housing and is adapted for pivoting movement about a horizontally extending axis. During non-use of the ashtray, the forwardly disposed sidewall of the ash receptacle forms the closure member for the opening of the ashtray housing. When the ashtray is to be used, the closure member is pushed slightly at its underside and is thereby urged inside the ashtray housing. This will cause the ash receptacle to be tilted slightly in the forward direction and to project with its forward edge into the occupant compartment.

The holding capacity of ashtrays of this type is, of necessity, relatively small, so that these ashtrays must be emptied relatively frequently. This is rather inconvenient, and it is therefore not uncommon that during extended periods of travel the content of the ashtray is simply emptied at the place where the vehicle happens to be parked.

It is the object of the invention to provide an ashtray of the type described in the foregoing wherein the ash receptacle can be withdrawn by rectilinear movement, and wherein the sliding movement of the ash receptacle is effected in a simple manner through movement of the ashtray closure member.

In accordance with the invention, this is accomplished in that the ash receptacle is guided at both sides for movement in a drawer-like fashion, and in that the closure member is mounted in an ashtray housing for pivoting movement about a horizontal axis and is provided with two lateral portions which extend perpendicularly to the plane of the closure member and which are in overlapping relationship with the sidewalls of the ash receptacle, and in that the closure member has pins, one on each side, which are adapted to engage into guide tracks provided in the sidewalls of the ash receptacle and which extend transversely to the movement of the ash receptacle.

In an ashtray arrangement of this type, the closure member is interconnected in a very simple manner to the ash receptacle. Pivoting movement of the closure member into the open position will cause the ash receptacle to be moved outwardly into the "in-use" position. As the closure member is pivoted into the closed position, the ash receptacle will automatically be returned to its storage position.

If a cigar lighter is arranged adjacent the ashtray, it may also be covered by the ashtray closure member. This is accomplished in that the closure member is enlarged so as to extend on one side past the width of the ash receptacle.

In accordance with another advantageous feature of the invention, the pivoting axis of the closure member extends, when the closure member is in its closed position, underneath the upper edge of the closure member and is spaced at a distance behind the plane thereof. This arrangement has the advantage that, in order to open the closure member, one need only push against the upper portion of the closure member in the region above the pivot axis thereof. The closure member will then pivot rearwardly as soon as it is unlatched.

To provide that the ash receptacle will be displaced far enough into the occupant compartment, the invention proposes that the pins engaging into the guide tracks be arranged so as to be located generally below the pivot axis of the closure member when the same is in the closed position.

Automatic outward movement of the ash receptacle, after unlatching of the closure member, is realized in a simple manner in that the closure member has a helical spring secured to one of its lateral portions which is adapted to exert a biasing force on the closure member in the direction of closing.

In accordance with a further feature of the invention, the maximum outward stroke of the ash receptacle is being limited in that a latching means is arranged in the bottom of the ashtray housing.

It should be appreciated that a variety of arrangements may be utilized in the practice of the invention. To convey the concept of the invention, one exemplary embodiment is illustrated in the drawings and described in the following.

IN THE DRAWINGS

FIG. 1 is a schematic side elevational view of the ashtray, with the ashtray being shown in the rearward position;

FIG. 2 is a view according to FIG. 1, with the ashtray being shown in the forward position;

Figure 3:
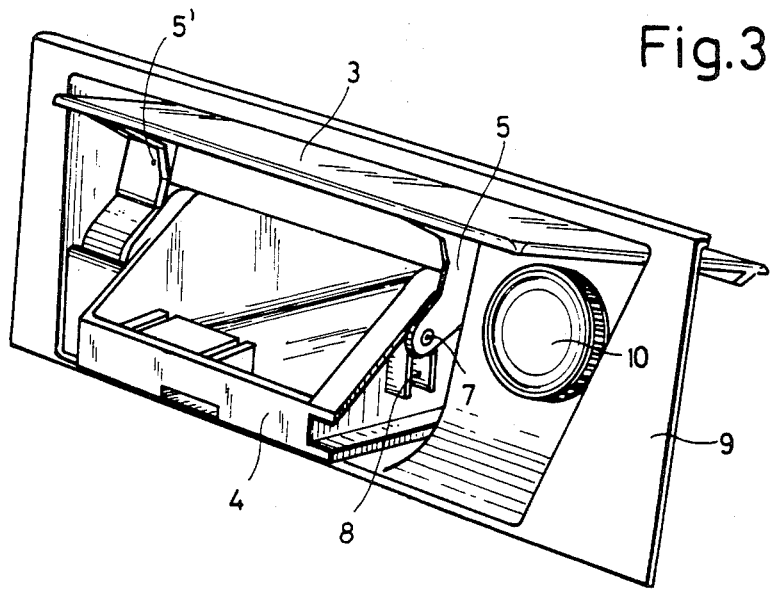
FIG. 3 is a perspective view of the ashtray, looking towards the ashtray from the front and at an angle.

FIG. 1 illustrates a panel 1 having an opening 2 which is closed by a closure member 3. Rearwardly of the closure member 3 there is an ash receptacle 4 which is slidably guided in a drawer-like fashion for rectilinear displacement towards the left side, as viewed in the drawing.

The afore-described sliding movement of the ashtray is rendered possible in that the closure member 3 is provided with lateral portions 5 which laterally overlap the ashtray 4. The lateral portions 5 have pivoting shafts 6 extending therethrough which are fixedly mounted to the housing 9 so as to enable pivoting movement of the closure member 3. Each lateral portion 5 is provided at a location below the pivot shaft 6 with a pin 7 which is adapted for engagement into a respective vertically extending guide track 8 provided on the outer surfaces of the sidewalls of the ash receptacle 4.

If one pushes against the cover member 3 in the upper region thereof, the cover member will be caused to pivot about the shafts 6, as illustrated in FIG. 2. During this movement, the pins 7, too, will swing about the shafts 6. This will cause the pins 7 to move upwardly in the guide tracks 8 and to pull the ash receptacle 4 forwardly.

FIG. 3 illustrates in detail the configuration of the ashtray. One will note again the ash receptacle 4 which is arranged in an ashtray housing 9 in a drawer-like fashion. One will also note the guide track 8 into which the lateral portion 5 of the closure member 3 is engaging through pin 7. The lateral portion 5' disposed opposite of the lateral portion 5 is in the form of a conventional spiral spring unit with a movement brake. This unit enables the closure member 3, after overcoming an initial resistance, to move automatically, but at a controlled speed which is not excessively high, into its end position.

It is also apparent from FIG. 3 that the closure member 3 extends past the lateral portion 5 so as to be able to conceal, when in its closed position, a cigar lighter 10 which is mounted adjacent the ashtray housing 9.

Figure 4:
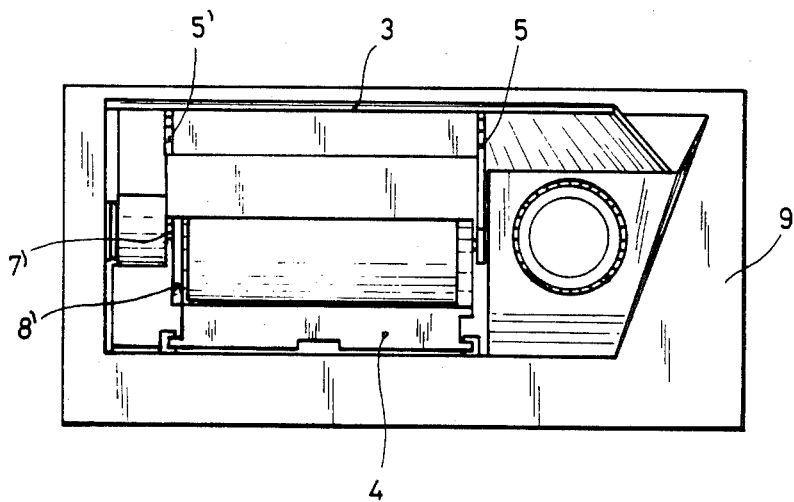
FIG. 4 is a front elevation of the ashtray according to FIG. 3.

FIG. 4 illustrates the ashtray housing 9 with the ash receptacle 4 as viewed from the front. One will note in this illustration the guide track 8' which is arranged opposite the guide track 8 illustrated in FIG. 3 and which has a pin 7' of the lateral portion 5' engaged therein. FIG. 4 also illustrates the closure member 3, the lateral portion 5 and the cigar lighter 10.

Figure 5:
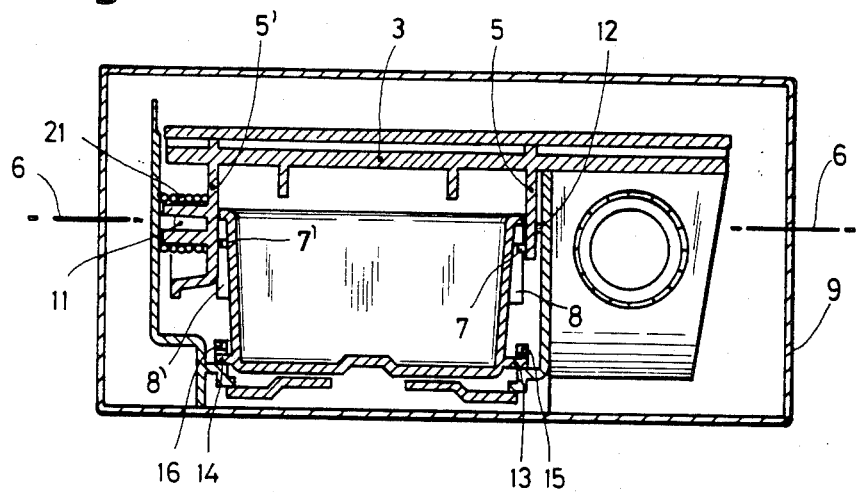
FIG. 5 is a transverse sectional view of the ashtray taken on a plane in the region of the two guide tracks.

In FIG. 5 one will note both guide tracks 8, 8', the lateral portions 5, 5' and the pins 7, 7' which engage into the guide tracks 8, 8'. One will also note the axle stubs 11, 12 which are supporting the cover member 3 and which form the pivot axis 6. It is also apparent from FIG. 5 that the ash receptacle 4 has outwardly directed guide means 13, 14 through which the ash receptacle is slidably guided in tracks 15, 16 which are rigidly fixed to the housing 9. Furthermore, one will note in the region of the lateral portion 5' a helical spring 21 through which the closure member 3 is biased in the direction of opening. The spring 21 exerts enough force onto the closure member 3 to move the same, after a given resistance has been overcome, into its open position and to thereby urge the ash receptacle 4 forwardly. The mechanism also includes a breaking means (not shown) which controls the movement of the ash receptacle and prevents the same from being catapulted outwardly.

Figure 6:
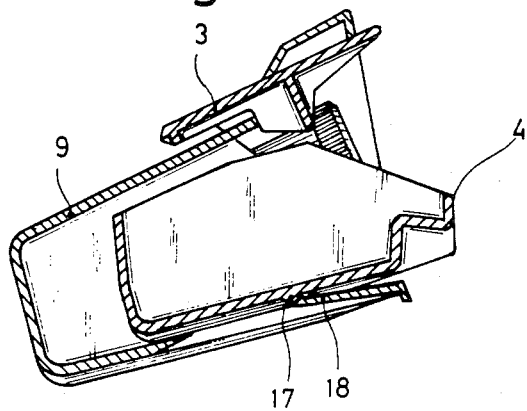
FIG. 6 is a longitudinal sectional view of the ashtray.
Figure 8:
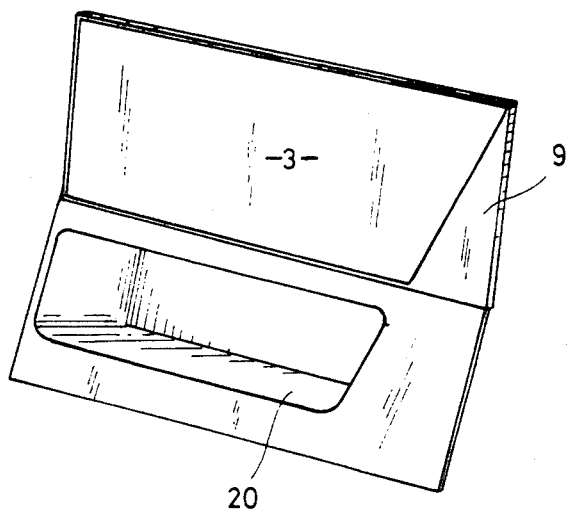
FIG. 8 is a perspective view of the ashtray, with the closure member being in the closed position.

FIG. 6 shows that the ash receptacle 4 has a downwardly directed cam 17 which, when the ash receptacle is in its outermost position, engages the catch 18 integral with the bottom of the housing 9 arranged in the bottom of the ashtray housing 9 so as to limit the outward movement of the ash receptacle 4. In order to remove the ash receptacle 4 completely from the ashtray housing, the user need only exert a relatively strong pull on the ash receptacle. This will cause the detent means 18 to be urged or deflected far enough downwardly to enable the hump 17 to travel on top thereof. As best shown in FIGS. 3, 5 and 8, the guide tracks 8, 8' have an opening at their topmost rearward ends to permit reception and removal of the guide pins 7, 7' from the guide tracks 8, 8'. When the closure member 3 is in its up or full open position, the pins 7, 7' are located closely adjacent the topmost ends of the guide tracks, as clearly shown in FIG. 2. Thus, when the closure member 3 is in this position, slight downward movement of the ashtray receptacle 4, as it is pulled forwardly, will release the same from the guide tracks 8, 8' and enable the ashtray receptacle to be removed completely from the housing 9.

Figure 7:
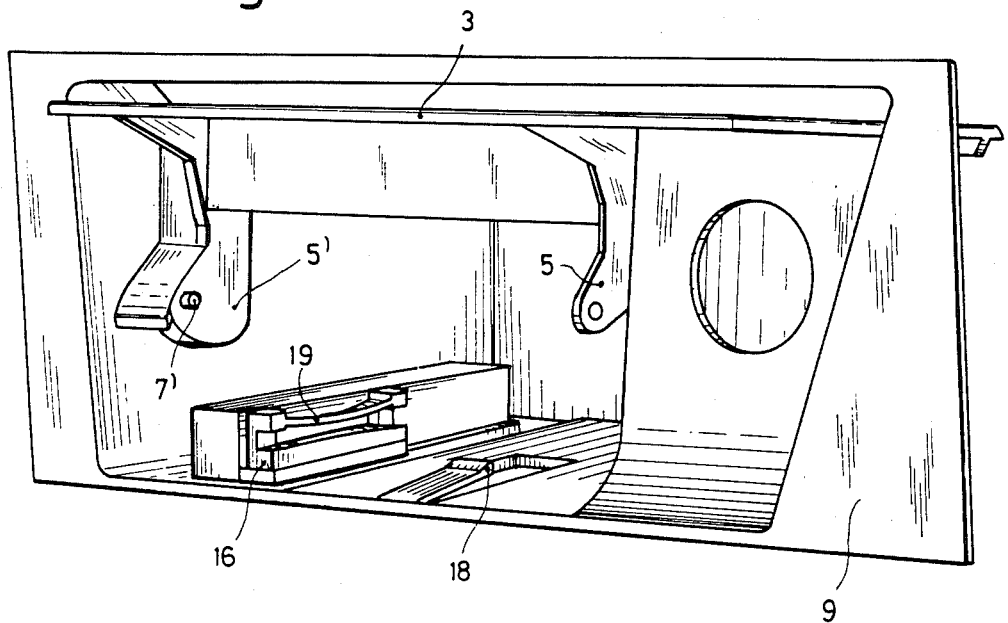
FIG. 7 is a perspective view of the ashtray housing, as viewed from the front, with the ashtray being removed.

In FIG. 7, one will note again the closure member 3 with its lateral portions 5, 5'. One will note in the lateral portion 5' the pin 7' which engages into the guide track 8' (illustrated in FIG. 4) when the ash receptacle 4 is inserted in the ashtray housing 9. FIG. 7 also illustrates very clearly the catch means 18 in the bottom of the housing 9. The guide rail 16 has a leaf spring 19 secured thereto which is adapted to exert a downwardly directed pressure onto the guide means 14 illustrated in FIG. 5. This will prevent rattling noises which may be generated due to play between the track and the guide means.

FIG. 8 is an illustration of the ashtray with the closure member 3 being in the closed position. The same figure also indicates that a utility compartment 20, which is always open, may be arranged below the cover member 3.

The embodiments of the invention in which an exclusive property or privilege is claimed are defined as follows:

1. An ashtray, especially for motor vehicles, including an ashtray housing, an ash receptacle adapted to be supported by the housing and moved relative thereto from a storage position into the direction of the occupant compartment, and including a closure member which is adapted to close off the ash receptacle from the occupant compartment, with the closure member and the ash receptacle being operatively interconnected to enable automatic displacement of the ash receptacle, and the ash receptacle being biased by the force of a spring into its forwardly projecting position, the improvement being that said ash receptacle 4 is slidably guided at its two side walls by said housing via a guide and track means in a drawer-like fashion for generally horizontal movement through an opening in said housing between a storage position and a forward position, the closure member 3 is mounted in the ashtray housing 9 for pivoting movement about a horizontal pivot axis 6 between a generally vertical closed position in which it closes off said opening and said ash receptacle and a generally horizontal open position in which it is disposed above said ash receptacle, said pivot axis 6 of the closure member 3 being positioned, when the closure member 3 is in the closed position, below the upper edge of the closure member 3 and being spaced rearwardly of the closure member 3, said closure member being provided with two lateral portions 5 which extend perpendicular to the plane of said closure member 3 and which are in overlapping relationship with the side walls of the ash receptacle 4, and the closure member being adapted to engage through transverse pins 7, 7' carried by said portions into respective guide tracks 8, 8' arranged in the side walls of the ash receptacle and which extend transversely of the direction of ash receptacle movement, said pins 7, 7' engaging the guide tracks 8, 8' being positioned, when the closure member 3 is in the closed position, at a location which is beneath the pivot axis 6 and the ashtray housing 9 having a catch means 18 thereon which is engageable with a cam 17 on the ashtray receptacle 4 to limit the extent of the forward movement of the ash receptacle.

2. An ashtray, as defined in claim 1, and wherein said cam 17 is on the bottom side of said ashtray receptacle 4 and said catch means 18 is a deflectable catch member integral with the bottom of said housing 9.

3. An ashtray, as defined in claim 2, and wherein said guide tracks 8, 8' are generally vertically disposed and have a rearward opening adjacent their topmost ends to permit reception and removal of the guide pins 7, 7' and wherein said guide pins 7, 7' are located closely adjacent said openings in said guide tracks 8, 8' when the closure member 3 is in its open position whereby said ashtray receptacle 4 can be removed from the housing 9 and said closure member 3 by pulling on the same to cause the cam 17 to deflect and ride over the catch member 18 and the pins 7, 7' to pass through the topmost openings in the guide tracks 8, 8'.

4. An ashtray, as defined in claim 1, and wherein the spring for biasing the ashtray receptacle toward its forward position is a helical spring operatively associated with one lateral position 5 of the closure member 3.

* * * * *